April 1, 1930.  W. W. MASON  1,752,603
BOTTLE CLOSURE
Filed Feb. 28, 1929   2 Sheets-Sheet 1
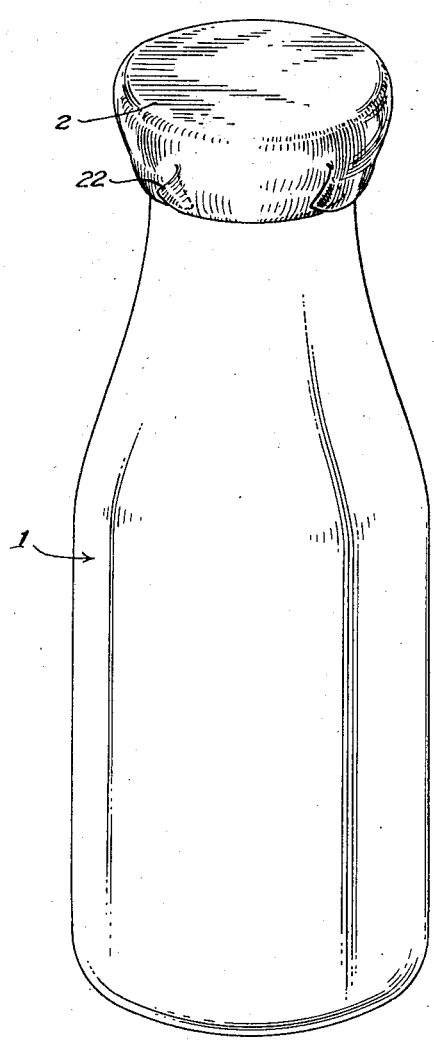
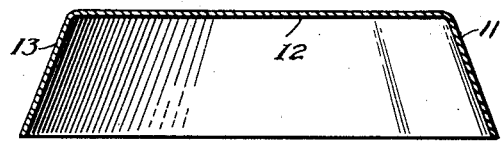
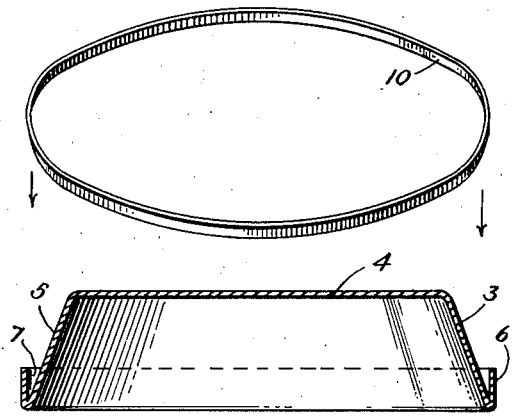
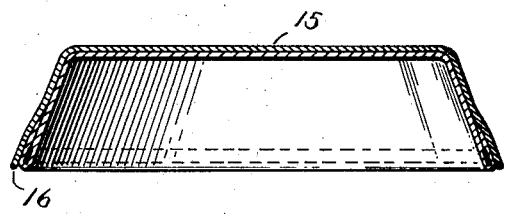
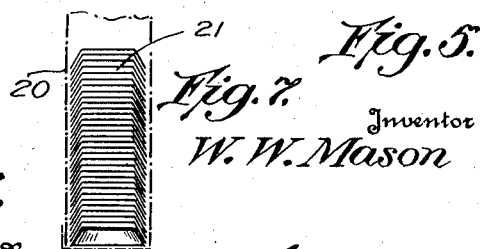
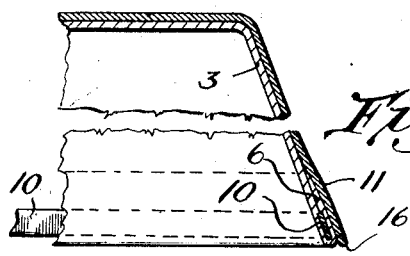
Inventor
W. W. Mason April 1, 1930. W. W. MASON 1,752,603
BOTTLE CLOSURE
Filed Feb. 28, 1929  2 Sheets-Sheet 2

Inventor
W. W. Mason
Attorney

Patented Apr. 1, 1930

1,752,603

UNITED STATES PATENT OFFICE

WESLEY W. MASON, OF BALTIMORE, MARYLAND

BOTTLE CLOSURE

Application filed February 28, 1929. Serial No. 343,380.

This invention relates to bottle closures and has for its object to provide a construction more simple in operation and effective in use than those heretofore proposed.

With these and other objects in view the invention consists in the novel details of construction and arrangements of parts all as will be more fully hereinafter disclosed and particularly pointed out in the claims.

Referring to the accompanying drawings forming a part of this specification in which like numerals designate like parts in all the views, Figure 1 is a perspective view of a milk bottle to which this invention has been applied;

Figure 2 is a vertical sectional view of the outer member forming part of the closure for the bottle;

Figure 3 is a perspective view of the reinforcement used in connection with this closure;

Figure 4 is a vertical sectional view illustrating the inner member of this closure;

Figure 5 is a vertical sectional view of the assembly of the parts illustrated in Figures 2, 3 and 4;

Figure 6 is a sectional detail on an enlarged scale of a portion of the parts shown in Figure 5 to more clearly illustrate the compression of the various members forming the completed closure;

Figure 7 is a diagrammatic representation of a plurality of these closures nested or stacked for economical or efficient handling;

Figure 8:
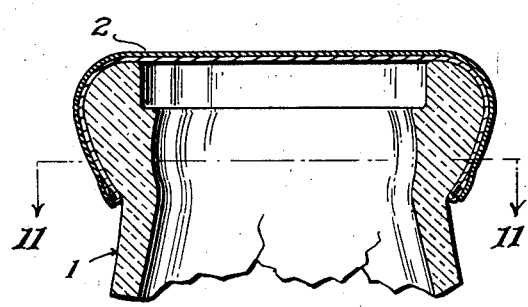
Figure 8 is a vertical sectional view of the mouth of a milk bottle showing the application of this closure thereto.

In order that this invention may be the better understood it is said that there was issued to me on April 24, 1923, U. S. Patent No. 1,453,077 for closure for container in which there was disclosed a paper closure of cup-shaped formation having a metallic element attached to and carried by the skirt portion so that when folded therewith the entire closure would tightly grip the exterior surface of the bottle to which it was applied. However, while that particular type of closure has been found more or less efficient, this present invention constitutes an important improvement over the prior construction.

That is to say, the prior construction involved a single layer of proofed paper whereas this invention contemplates a double thickness of paper or the like, thereby strengthening the closure against accidental perforation through which the goods could be contaminated. In addition the prior construction involved the use of a metallic element such as a wire, ring or band about which the lower edge portion of the skirt of the closure was outwardly and upwardly turned so that the said element lay within a pocket which was not closed permanently and actually against admission of moisture or foreign ingredients all to the damage of the metal of said element through rust or the like, which would affect the paper. In other words, not only would the metallic ring be weakened but the paper thereabout would be subjected to chemical action as a result of which the seal would become weakened and perhaps destroyed, to the end that the goods could be contaminated by entry through or under the closure. This invention, on the other hand, overcomes all of these objections and defects by providing a closure of double thickness as well as one in which the metallic reinforcing member is actually and completely embedded or sealed within the confines of the closure whereby no extraneous substances may affect the seal and contaminate the goods within the container.

In the drawings 1 indicates a well known type of milk bottle to which the closure, generally indicated by the numeral 2, has been applied. The closure comprises three parts, the inner member produced by preforming as by molding or drawing, a circular disk or paper or the like into a dished or cup-shaped formation, as illustrated in Figure 4 by the numeral 3. It is to be noted that this member 3 is provided with a substantially flat portion 4 having the conically disposed sides 5, the outer peripheral edges of which have been reversely formed as at 6 to provide the exterior pocket 7 into which is fitted or pressed the second part of the closure which is a metallic reinforcing element such as a thin narrow band 10 illustrated in Figure 3. The flanges 6 are then tightly compressed about the reinforcement 10 within the pocket 7 and then the third part of the closure, comprising the outer member 11 which is formed similarly to the member 3 except in its peripheral edge formation, is forced over the members 3 and 10 to produce an assembly illustrated in Figure 5. That is to say, the outer member 11 has a substantially flat portion 12 which in the assembled closure contacts with the flat portion 4 of the inner member 3, and the conically formed sides 13 of the outer member closely and contactingly fit the outer surfaces of the sides 5 and the flanges 6 of the inner member.

The members 3 and 11 are cut as disks from a fine grade of paper and then the disks are submitted to a proofing action which will render the same water-proof and impervious to all of the usual liquid or moisture contacts to which closures of this character are subject. The treated disks are then delivered to the forming dies to create the shapes shown in Figures 2 and 4. After the reinforcement 10 has been dropped into the pocket 7 the outer member 11 is positioned over the inner member 3 and then the entire assembly is subjected to heat and pressure by suitable dies to cause a natural cementing of the members in the form shown in Figure 5. It thus results that the reinforcing member is disposed in a completely sealed pocket, since the edges of the flanges 6 of the inner member can not be accidentally opened to expose the reinforcing member since they are covered by the peripheral portion of the outer member 11. Therefore, any liquid which may fall upon the top 15 of this closure would run off therefrom down the sides and drop from the extreme edge portion 16 without in any way affecting the seal.

The pressure applied in cementing the inner and outer members together is sufficient to cause a relatively smooth joint, or in other words, the portion of the closure adjacent the reinforcement will not have a pronounced bulge but will have an appearance and finish in accordance with the illustration in Figure 6, it being understood of course that the thickness of the elements making up the closure have been exaggerated in the drawings for the purpose of clearly showing the construction. In actual practice 4 to 8 point paper is used so that the double thickness closure will have a total thickness commensurate with a paper of from 8 to 16 points. The reinforcing member is preferably formed as a complete ring either by spot-welding or otherwise, from material of about 22 to 24 gauge American standard, so it will be readily seen that the closure will not have any relatively great thickness. The reinforcing member also is made of non-resilient material so that it is pliable, and the rings may or may not be treated previously to embedding in the closure.

Figure 10:
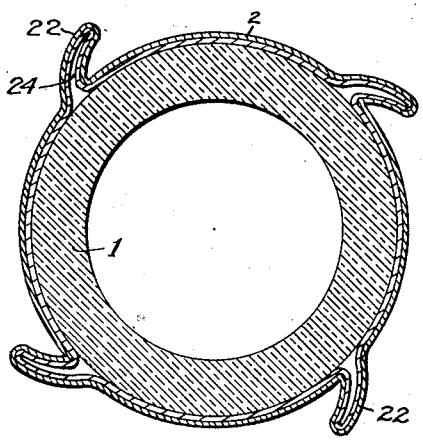
Figure 10 is a view similar to Figure 9 showing the result of a further step in the application of pressure and sealing of the closure about the neck of a bottle.
Figure 9:
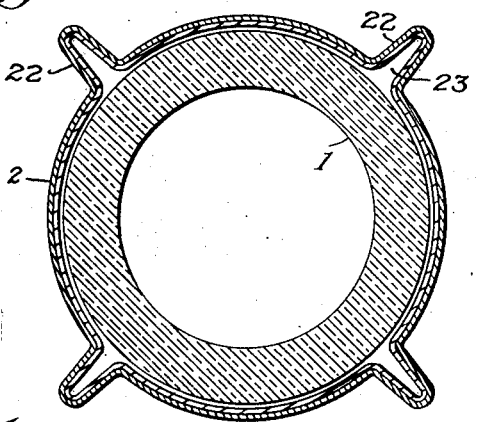
Figure 9 is a horizontal sectional view taken through the neck of a milk bottle illustrating the result of the initial application of pressure to the closure in sealing the bottle.
Figure 11:
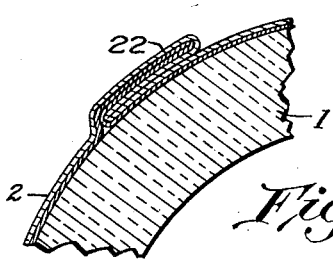
Figure 11 is an enlarged fragmentary horizontal sectional view taken as on the lines 11—11 of Figure 8 and looking in the direction of the arrows, showing the completed seal of the closure with respect to the bottle.

The application of the closure will now be described. In the case of packaging milk, the bottles are automatically fed by conveyer to the capping apparatus wherein there is employed a feeding tube such as diagrammatically illustrated at 20 in Figure 7. Within such a tube the closures are contained in nested formation as also indicated in said figure at 21, so that as a bottle comes beneath the capping tube, a closure can be automatically released therefrom to drop over the mouth of the bottle. Dies subsequently operate upon positioned closure, said dies being preferably four in number and spaced equally about the bottle, to press the closure tightly over the mouth of the bottle, said dies adapted to contract the closure to produce folds therein as illustrated in Figure 9 by the numeral 22. Continued operation of the dies causes the folds to be compressed reducing the space 23 therein as illustrated at 24 in Figure 10. The dies are so dimensioned and actuated that, when this compression takes place, the closure will be gripped tightly about the neck of the bottle. The dies are pivotally mounted so that the compressed folds will be subsequently turned from a radial position, with respect to the bottle, toward and against the bottle to ultimately lie in circumferential relation thereagainst as indicated in Figure 11. Figure 10 illustrates an intermediate step in the sealing operation wherein it will be seen that the folds have been compressed and are moving in the direction indicated toward the bottle, and Figure 11 illustrates the completely sealed fold of the closure. When it is desired to remove a closure thus applied, all that is necessary to do is to apply pressure against the peripheral edge of the closure at one of the flattened folds whereupon, due to the soft nature of the reinforcing member, the fold will yield, opening outwardly sufficiently to permit the closure to be slipped off the bottle. It is obvious that in the sealing operation the folds or bent portions 22 of the closure may be left outstanding in a radial direction as shown in Figure 9 instead of turned or flattened against the sides of the container as shown in Figure 11, whereby the closure is given a plurality of extensions constituting levers assisting in the removal of said closure.

Figure 12:
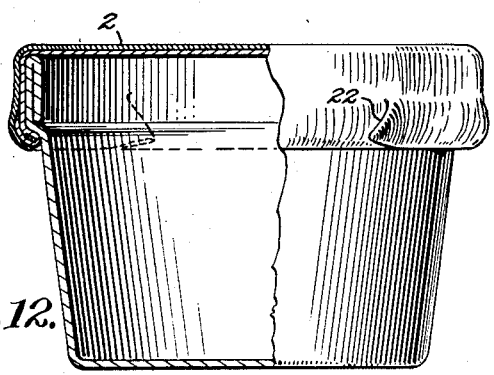
Figure 12 is a view, partly in section, illustrating the application of a closure made in accordance with this invention to a container other than a milk bottle.
Figure 13:
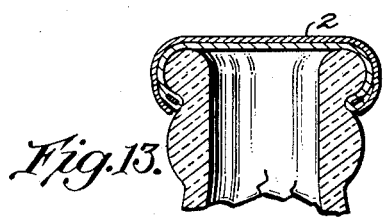
Figure 13 is a vertical sectional view of the neck of a container on which a closure of the type made in accordance with this invention is substituted for the heretofore well known Crown finish seal.

In Figures 12 and 13 there has been illustrated modifications of the containers to which this closure is applied but the same underlying principle is retained namely, a paper disk cover having a reinforcement adjacent the peripheral edge or at such other point that, when pressure is applied by crimping or folding the material of the closure, the reinforcement will cause the closure to grip tightly a portion of the container where there is a shoulder so that the closure can not be removed from the receptacle without application of pressure. In Figure 12 this type of closure is shown used in connection with a fiber container such as commonly used for cheese and the like, whereas in Figure 13 a closure of the same type has been shown applied as a crown seal for a container adapted to hold goods not intended for immediate use, as contradistinguished from a milk bottle.

Figure 14:
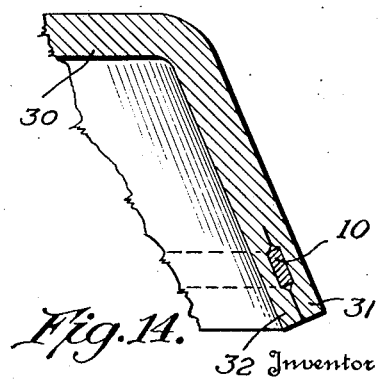
Figure 14 is a much enlarged vertical sectional detail illustrating a modification in the application of the reinforcing member to a closure.

Coming now to Figure 14 there is disclosed a modification of the invention above described, wherein the closure 30 comprises a member of single thickness and of a weight comparable to 12 to 16 point paper, the peripheral edge of which has been split substantially into halves 31 and 32 which are separated sufficiently to receive therebetween the reinforcing element 10. Pressure is then applied to seal the two halves 31 and 32 together so that the band 10 is completely contained within the material of the closure. As in the prior case, this closure is likewise formed of fibrous material such as paper which is pretreated to make the same waterproof, etc., before the application of the reinforcing member, so that when the two halves 31 and 32 are pressed together with application of slight heat they will become adhered, thus sealing the reinforcement within the material. A better seal is obtained by using a reinforcing member which has a coating of adhesive applied thereto, and the pressure utilized in sealing the halves is sufficient to embed the reinforcing member in the halves so that smooth exterior surfaces are formed on the closure. In the modified form shown in Figure 14, as in the form shown in Figure 6, it is to be observed that no liquid falling upon the top of the closure will reach the reinforcing member to cause damage thereto.

Further, in view of the construction disclosed in Figure 14, the construction shown in Figure 6 could be modified by the elimination of the turned-up edge portion 6 forming the pocket 7 whereby the ring 10 would be in contact with both members 3 and 11 and the closure would be thinner at the metal reinforcement.

It is obvious that those skilled in the art may vary the details of construction as well as arrangement of parts without departing from the spirit of the invention, and therefore it is not desired to be limited to the foregoing disclosure except as may be required by the claims.

What is claimed is:—

1. A closure for containers comprising a preformed non-resilient flexible covering to seat over the mouth of a container said covering having downwardly extending portions, a non-resilient metallic element attached to and carried by one of said portions and foldable therewith when said portions are contracted beneath the container mouth, the other of said portions completely covering the said attachment.

2. A closure for containers comprising a preformed non-resilient flexible covering to seat over the mouth of a container said covering having downwardly extending portions one of which is exteriorly and circumferentially disposed with relation to the other, a non-resilient metallic element attached to and carried by one of said portions and foldable therewith when said portions are contracted beneath the container mouth, the other of said portions completely covering the said attachment.

3. A closure for containers comprising a preformed non-resilient flexible covering to seat over the mouth of a container said covering having downwardly extending portions, a non-resilient metallic ring attached to and carried by one of said portions and foldable therewith when said portions are contracted beneath the container mouth, the other of said portions completely covering the said attachment.

4. A closure for containers comprising a preformed non-resilient flexible covering to seat over the mouth of a container said covering having downwardly extending portions, a non-resilient metallic element adhesively attached to and carried by one of said portions and bendable therewith when said portions are contracted beneath the container mouth, the other of said portions completely covering the said attachment.

5. A closure for containers comprising a preformed non-resilient flexible covering to seat over the mouth of a container said covering having downwardly extending portions, a non-resilient metallic element coated with an adhesive by means of which it is attached to and carried by one of said portions and foldable therewith when said portions are contracted beneath the container mouth, the other of said portions completely covering the said attachment.

6. A closure for containers comprising a cup-shaped non-resilient flexible covering to seat over the mouth of a container said covering having a downwardly extending skirt split at its peripheral edge to provide half portions, a non-resilient metallic element attached to and carried by one of said portions and foldable therewith when said portions are contracted beneath the container mouth, the other of said portions completely covering the said attachment.

7. A paper closure for containers comprising a covering having a downwardly extending skirt having buried therein a metallic holding element which latter is bendable with said skirt in the fastening of said closure.

8. A closure for containers comprising a paper covering having inner and outer downwardly extending portions, and a metallic holding element between said portions adjacent their outer extremities, said element completely covered by said portions and bendable therewith in the fastening of said closure.

In testimony whereof I affix my signature.

WESLEY W. MASON.